United States Patent
Wu et al.

(10) Patent No.: US 9,888,635 B2
(45) Date of Patent: Feb. 13, 2018

(54) VEGETABLE PRESERVATION AND GROWING CASE

(71) Applicants: HAIER GROUP CORPORATION, Qingdao, Shandong (CN); QINGDAO HAIGAO DESIGN & MANUFACTURING CO., LTD, Qingdao, Shandong (CN)

(72) Inventors: Jian Wu, Shandong (CN); Shu Zhou, Shandong (CN); Zhaojun Fei, Shandong (CN); Haibo Liu, Shandong (CN)

(73) Assignees: HAIER GROUP CORPORATION, Qingdao, Shandong (CN); QINGDAO HAIGAO DESIGN & MANUFACTURING CO., LTD, Qingdao, Shangdong (CN)

( * ) Notice: Subject to any disclaimer, the term of this patent is extended or adjusted under 35 U.S.C. 154(b) by 137 days.

(21) Appl. No.: 14/894,910

(22) PCT Filed: Mar. 31, 2014

(86) PCT No.: PCT/CN2014/074378
§ 371 (c)(1),
(2) Date: Nov. 30, 2015

(87) PCT Pub. No.: WO2014/190799
PCT Pub. Date: Dec. 4, 2014

(65) Prior Publication Data
US 2016/0113223 A1   Apr. 28, 2016

(30) Foreign Application Priority Data
May 30, 2013  (CN) .......................... 2013 1 0209574

(51) Int. Cl.
*A01G 31/06* (2006.01)
*A23B 7/158* (2006.01)
*A01G 31/00* (2018.01)

(52) U.S. Cl.
CPC .............. *A01G 31/06* (2013.01); *A23B 7/158* (2013.01); *A01G 2031/006* (2013.01); *Y02P 60/216* (2015.11)

(58) Field of Classification Search
CPC ......... A01G 31/00; A01G 31/02; A01G 31/06
(Continued)

(56) References Cited

U.S. PATENT DOCUMENTS 2,928,211 A * 3/1960 Martin ................... A01G 31/06
                                                      47/60
3,458,951 A * 8/1969 Martin ................... A01G 31/06
                                                      239/524
(Continued)

FOREIGN PATENT DOCUMENTS

CN       201274696 Y       7/2009
CN       101843276 A       9/2010
(Continued)

OTHER PUBLICATIONS

State Intellectual Property Office of the P.R. China (ISR/CN), "International Search Report for PCT/CN2014/074378", China, dated Jul. 9, 2014.

*Primary Examiner* — David Parsley
(74) *Attorney, Agent, or Firm* — Tim Tingkang Xia, Esq.; Locke Lord LLP (57) ABSTRACT

A vegetable preservation and growing case includes a thermally-insulated case body for vegetable growing or preservation. An electrical control component is electrically controlling the thermally-insulated case. A pipeline component is circularly supplying a nutrient solution to the thermally-insulated case body under an action of gravity. The preser- (Continued)

vation and growing case allows the freshness of a vegetable to be preserved for an extended period of time, has a simple structure, and is easy to maintain.

13 Claims, 4 Drawing Sheets

(58) Field of Classification Search
USPC .................................. 47/48.5, 59 R, 60, 62 R
See application file for complete search history.

(56) References Cited

U.S. PATENT DOCUMENTS

| | | | | | |
|---|---|---|---|---|---|
| 4,255,897 | A | * | 3/1981 | Ruthner | A01G 7/045 47/17 |
| 4,332,105 | A | * | 6/1982 | Nir | A01G 31/02 137/563 |
| 4,869,019 | A | * | 9/1989 | Ehrlich | A01G 31/06 47/59 R |
| 4,953,363 | A | * | 9/1990 | Primozic | A47F 3/0495 312/116 |
| 5,073,401 | A | * | 12/1991 | Mohr | A01G 31/042 426/138 |
| 5,283,974 | A | * | 2/1994 | Graf, Jr. | A01G 9/16 47/60 |
| 8,234,812 | B1 | * | 8/2012 | Colless | A01G 9/16 47/61 |
| 8,726,568 | B2 | * | 5/2014 | Wilson | A01G 31/00 47/62 R |
| 8,910,419 | B1 | * | 12/2014 | Oberst | A01G 31/06 47/60 |
| 8,915,015 | B1 | * | 12/2014 | Augspurger | A01G 9/14 47/17 |

FOREIGN PATENT DOCUMENTS

| | | |
|---|---|---|
| CN | 202285745 U | 7/2012 |
| CN | 202310799 U | 7/2012 |
| CN | 202406719 U | 9/2012 |
| CN | 202588019 U | 12/2012 |
| KR | 101034513 B1 | 5/2011 |

\* cited by examiner

VEGETABLE PRESERVATION AND GROWING CASE

CROSS-REFERENCE TO RELATED APPLICATION

This application claims priority to Chinese Patent Application No. 201310209574.5, filed May 30, 2013 in the State Intellectual Property Office of P.R. China, which is incorporated herein by reference in its entirety.

FIELD OF THE INVENTION

The present invention relates to the field of vegetable preservation technologies, and in particular, to a vegetable preservation and growing case.

BACKGROUND OF THE INVENTION

In modern life, people implement vegetable preservation by using refrigerator freezing technologies, while the refrigerator freezing technologies only slow decaying of food such as vegetable, and time for slowing food decaying is also very short. With the continuous improvement of living standards, people hope to obtain a product, which can keep vegetable still in a stagnant growth state or in a slow-growing state after the vegetable is picked and sold, to ensure long-time vegetable preservation.

SUMMARY OF THE INVENTION

The present invention is briefly described below, to provide basic understandings about some aspects of the present invention. It should be understood that, this overview of the present invention is not exhaustive, which neither intends to determine a key or an important part of the present invention, nor intends to limit the scope of the present invention. It only intends to give some concepts in a simplified form, and use these as preamble to a more detailed description described later.

The present invention provides a vegetable preservation and growing case, which may implement long-time vegetable preservation, including: a thermal insulation case body for vegetable growing or preservation, where a circuit component for electrically controlling the thermal insulation case body, and a pipeline component for circularly supplying a nutrient solution to the thermal insulation case body are disposed at the back of the thermal insulation case body.

In the technical solution provided in the present invention, vegetable is grown or preserved in the thermal insulation case body, and a nutrient solution is circulated in the box by using the pipeline component, so that the vegetable can continuously absorb nutrients, and can also be in a stagnant growth state or in a slow-growing state after the vegetable is picked and sold, thereby obtaining long-time preservation; the thermal insulation case body is controlled by the electric control component, so that the box can keep a growing environment needed by the vegetable; and the electric control component is disposed at the back of the thermal insulation case body, which has simple structure, is easy to maintain, and beautifies the appearance.

DETAILED DESCRIPTION OF THE INVENTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments is some but not all of the embodiments of the present invention. Elements or features described in one figure or one implementation manner of the present invention may be combined with elements and features shown in one or more other figures or implementation manners. It should be noted that, for the purpose of clarity, representations and descriptions of parts and processing that are irrelevant to the present invention and known to one of ordinary skill in the art are omitted in the accompanying drawings and illustration. All other embodiments obtained by a person of ordinary skill in the art based on the embodiments of the present invention shall fall within the protection scope of the present invention.

Figure 1:
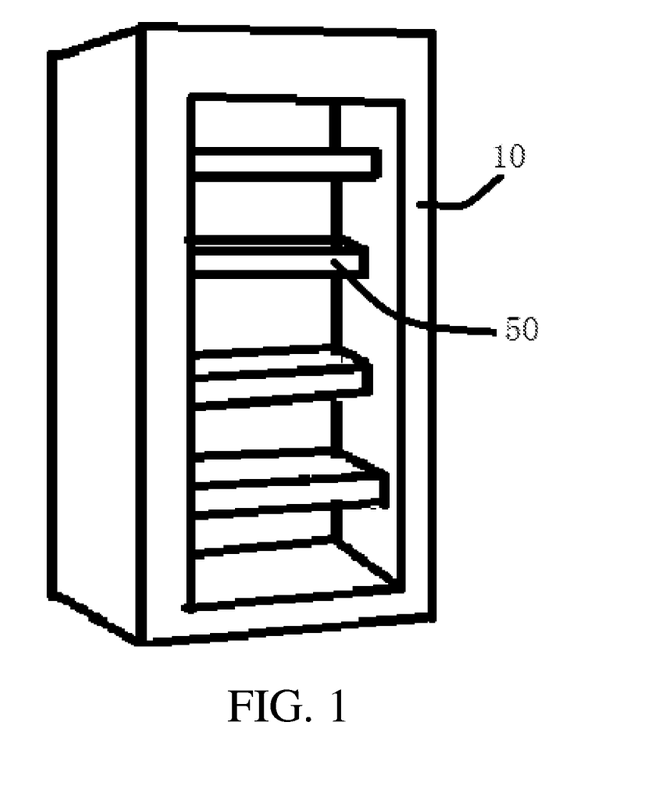
FIG. 1 is a schematic structural diagram of a vegetable preservation and growing case according to an embodiment of the present invention.
Figure 2:
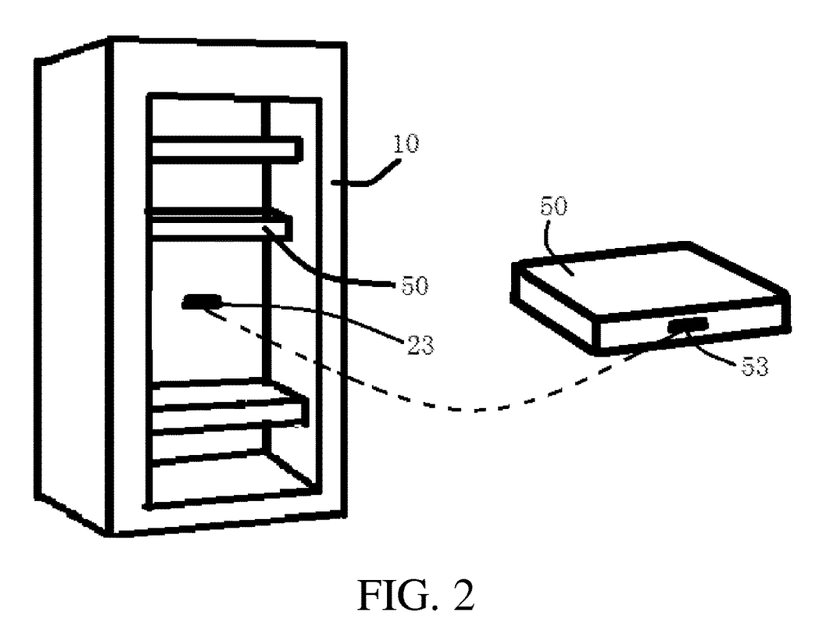
FIG. 2 is an exploded diagram of the vegetable preservation and growing case in FIG. 1.
Figure 3:
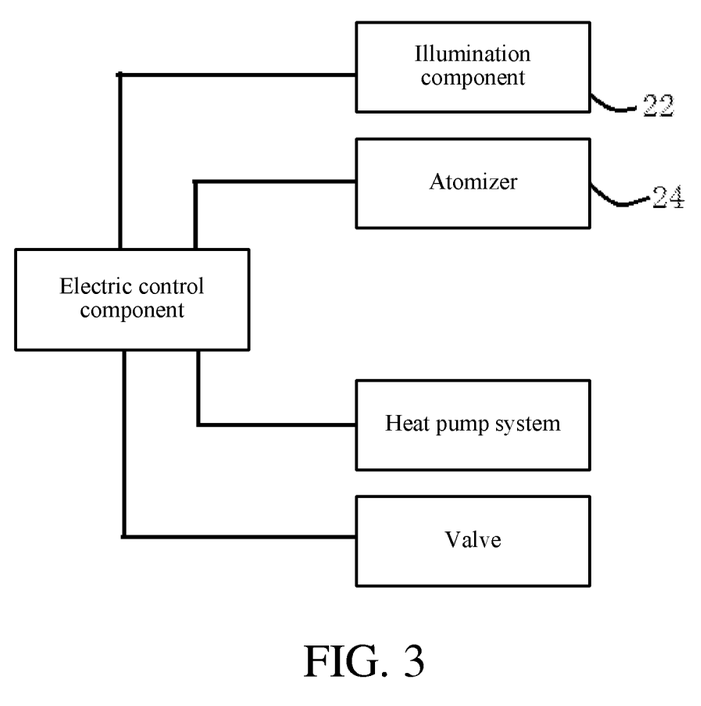
FIG. 3 is a schematic diagram of an electric connection when an electric control component controls a thermal insulation case body in the vegetable preservation and growing case of the present invention.

FIG. 1 is a schematic structural diagram of a vegetable preservation and growing case according to an embodiment of the present invention. FIG. 2 is an exploded diagram of the vegetable preservation and growing case in FIG. 1. FIG. 3 is a schematic diagram of an electric connection when an electric control component controls a thermal insulation case body in the vegetable preservation and growing case of the present invention. As shown in FIGS. 1-3, the vegetable preservation and growing case includes:

a thermal insulation case body 10 for vegetable growing or preservation, where an electric control component for electrically controlling the thermal insulation case body 10, and a pipeline component for circularly supplying a nutrient solution to the thermal insulation case body 10 are disposed at the back of the thermal insulation case body 10.

Vegetable is grown or preserved in the thermal insulation case body, and a nutrient solution is circulated in the box by using the pipeline component, so that the vegetable can continuously absorb nutrients, and can also be in a stagnant growth state or in a slow-growing state after the vegetable is picked and sold, thereby obtaining long-time preservation; the thermal insulation case body is controlled by the electric control component, so that the box can keep a growing environment needed by the vegetable; and the electric control component is disposed at the back of the thermal insulation case body, which has simple structure, is easy to maintain, and beautifies the appearance.

The foregoing electric control component includes a first electromagnetic connection portion 23 extending out of an inner surface of the thermal insulation case body 10, and at least one vegetable carrying component 50 in water communication with the foregoing pipeline component is further disposed in the thermal insulation case body 10, where an end of each vegetable carrying component 50 is provided with a second electromagnetic connection portion 53, for being connected to a corresponding first electromagnetic connection portion 23. In this manner, the electric control component is connected to a circuit provided on the vegetable carrying component 50. For example, an illumination component 22 and/or an atomizer 24 may be disposed on the vegetable carrying component 50, and are connected to the first electromagnetic connection portion 23 through the second electromagnetic connection portion 53, so as to work under the control of the electric control component. The illumination component 22 is specifically configured to illuminate each vegetable carrying component 50 from top to bottom. For example, a light guide plate that is electrically connected to the electric control component through the first electromagnetic connection portion 23 may be disposed above each vegetable carrying component 50, where the electric control component may control luminous intensity of the light guide plate to be within a luminous intensity range suitable for growth of vegetable on the carrying component 50.

The illumination component 22 illuminates the vegetable carrying member from top to bottom, and is connected to the first electromagnetic connection portion 23, so that the electric control component can control a state of the illumination component 22, and therefore, uniformity of luminance not only can be ensured, but also can be adjusted according to an actual need, which can provide a luminous environment needed by the vegetable on the vegetable carrying component 50, and is beneficial to vegetable preservation.

Specifically, as shown in FIG. 1, the vegetable preservation and growing case of the present invention may include multiple vegetable carrying components 50, and the multiple vegetable carrying components 50 are disposed in parallel at intervals in a vertical direction.

In this manner, different types of vegetable may be placed on different vegetable carrying components, which is convenient for a user to fetch or place vegetable, and can implement preservation for different types of vegetable in different areas.

Further, the bottom of an upper vegetable carrying component 50 is provided with the illumination component 22 for illuminating a vegetable carrying component 50 located below the upper vegetable carrying member 50, that is, an illumination component 22 disposed at the bottom of any one of vegetable carrying components 50 may be configured to illuminate a vegetable carrying member 50 located below a vegetable carrying component, which implements illumination of the vegetable carrying components 50 from top to bottom. In this manner, space can be saved, structure is simple, and cabling is convenient. Further, an illumination component for illuminating a top vegetable carrying component 50 may be disposed at the top of internal space of the thermal insulation case body 10.

The atomizer 24 may be specifically configured to atomize the nutrient solution, which helps vegetable absorb nutrients, and be preserved more effectively. The electric control component controls a state of the atomizer 24, so that humidity in the thermal insulation case body 10 may be controlled, and a degree in which the vegetable absorbs nutrients may also be controlled, and therefore, the vegetable is grown in a controllable state.

The atomizer 24 may be specifically disposed in the center of the bottom of the vegetable carrying component 50, helping the vegetable to uniformly absorb nutrients from the root.

In this embodiment, the illumination component 22 and/or the atomizer 24 are connected to the first electromagnetic connection portion 23 through the second electromagnetic connection portion 53, so as to be connected to the electric control component. In a case in which the vegetable carrying component is provided with no illumination component 22 and/or atomizer 24, the illumination component 22 and/or the atomizer 24 may be connected to the electric control component through an independent wire, or may be connected to the electric control component in another manner.

Optionally, each vegetable carrying component 50 is disposed in the thermal insulation case body 10 in a pluggable manner, the second electromagnetic connection portion 53 is connected to the first electromagnetic connection portion 23 in a pluggable manner, and when the second electromagnetic connection portion 53 of each vegetable carrying component 50 disconnects an electric connection to the first electromagnetic connection portion 23 of the electric control component, the electric control component correlatively controls the pipeline component to disconnect a water connection to a corresponding vegetable carrying component 50.

In the foregoing manner, the vegetable carrying component 50 can be conveniently pulled out from the thermal insulation case body 10, which facilitates vegetable fetching and placing, and facilitates maintenance. In addition, in the foregoing manner, each vegetable carrying component 50 may work independently, and does not affect, after being taken out from thermal insulation case body 10, normal work of another vegetable carrying component 50; and the electric connection is in linkage with the water connection, so that an occurrence of a water linkage is avoided when the vegetable carrying component 50 is taken out.

As a specific implementation manner, a pluggable connector may be disposed at a water connection area between the pipeline component and each vegetable carrying component 50, and a valve is disposed at the connector. After the electric control component disconnects an electric connection to a vegetable carrying component 50, the electric control component immediately controls a corresponding valve to be closed, to block a passage of the nutrient solution in the pipeline component towards the vegetable carrying component.

Specifically, each vegetable carrying component 50 includes a solution carrying case and a vegetable shelf located above the solution carrying case, and the atomizer 24 may be disposed in the solution carrying case. Multiple through holes in communication with the vegetable shelf may be disposed on the solution carrying case, for insertion of a root of vegetable.

Further, protruding diversion partitions are provided in the solution carrying case to form a zigzag flow passage, and the vegetable shelf is disposed overhead relative to the top of the flow passage. By disposing the diversion partitions, a corner stagnating the nutrient solution may be avoided from being formed in the solution carrying case, facilitating smooth circulation of the nutrient solution in the pipeline component. The vegetable shelf is disposed overhead relative to the top of the flow passage, which can avoid that a root of vegetable from being immersed in a fluid and becoming rotten.

Figure 4:
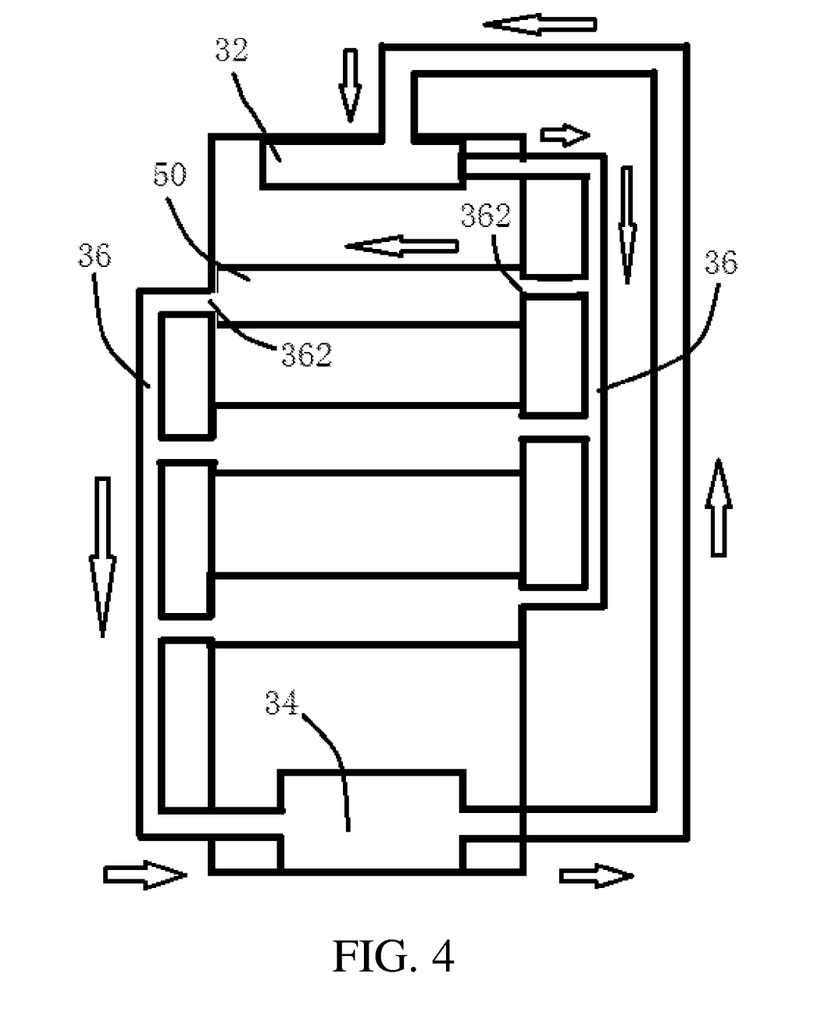
FIG. 4 is a schematic diagram of a water connection between a pipeline component and an upper container, a lower container, and a vegetable carrying component of the vegetable preservation and growing case of the present invention.

FIG. 4 is a schematic diagram of a water connection between the pipeline component and an upper container 32, a lower container 34, and the vegetable carrying component 50 of the vegetable preservation and growing case of the present invention. Referring to FIG. 3, the upper container 32 and the lower container 34 in FIG. 4 may be disposed in the thermal insulation case body 10, where the upper container 32 may be specifically disposed on the top of the thermal insulation case body 10, and the lower container 34 may be specifically disposed at the bottom of the thermal insulation case body 10. The foregoing pipeline component includes a liquid circulation pipeline 36 in communication with the upper container 32 and the lower container 34, where the liquid circulation pipeline 36 is provided with at least two through holes 362 at intervals in a vertical direction, and is communication with at least two corresponding vegetable carrying components 50 through the through holes 362.

Therefore, the nutrient solution may be sequentially circulated among the upper container 32, the circulation pipeline 36, each vegetable carrying component 50, and the lower container 34 to form an independent circulation passage. In this manner, each carrying member 59 may work independently, and does not affect normal work of another vegetable carrying component 50 when disconnecting the water connection to the circulation pipeline 36. In addition, in this manner, the nutrient solution may separately flows to each vegetable carrying component 50 after flowing to the lower container 34 and the upper container 32, which avoids a problem that because of different heights of the vegetable carrying components 50, hydraulic pressures are different and accordingly, the nutrient solution is supplied unevenly.

Further, each vegetable carrying component 50 includes a high-level liquid inlet and a low-level liquid outlet, where the high-level liquid inlet is in communication with the upper container 32, the low-level liquid outlet is in communication with the lower container 34, and a nutrient solution in the upper container 32 flows back to the lower container 34 through each vegetable carrying component 50 under the action of gravity. The nutrient solution flows through the vegetable carrying component 50 under the action of gravity, so that the nutrient solution is slowly circulated, which avoids, at no additional costs, a problem that a growing environment is unsuitable for vegetable caused by an excessively fast circulation speed. It may be known from the foregoing description that, the high-level liquid inlet and the low-level liquid outlet may be specifically disposed on the solution carrying case.

Optionally, a valve for controlling supply of water of each through hole is provided on the liquid circulation pipeline, and the electric control component is configured to control a state of the valve. The valve corresponding to each through is controlled to be on or off, so that a water connection between the liquid circulation pipeline and each vegetable carrying component 50 may be controlled to be connected or disconnected. Thus, the water connection between the vegetable carrying component 50 and the pipeline component may be correlatively controlled while circuit control is implemented. For example, after the electric control component is disconnected from a circuit interface of a vegetable carrying component 50, the electric control component may also control, by closing a corresponding valve, a water connection, which is a liquid passage for supplying the nutrient solution to the vegetable carrying component 50, that is, a through hole 362 in communication with the vegetable carrying component 50, connected to the vegetable carrying component 50 to be disconnected; and when the vegetable carrying component 50 is put into the thermal insulation case body 10 again, the circuit interface thereof is reconnected to the circuit component. The through hole and vegetable carrying component 50 may be reconnected by opening the valve.

Specifically, the liquid circulation pipeline 36 may be in water communication with each vegetable carrying component 50 by using a pluggable connector. The vegetable carrying component 50 is connected to the liquid circulation pipeline 36 by using the pluggable connector, which facilitates maintenance, is easy to operate, and is easy to correct small plug-misplacement by means of a fine adjustment. For example, each pluggable connector may be disposed at a connection between the through hole 362 of the liquid circulation pipeline 36 and the high-level liquid inlet of the vegetable carrying component 50, or may be disposed at a connection between the through hole 362 of the liquid circulation pipeline 36 and the low-level liquid outlet of the vegetable carrying component 50, which may specifically include a steel-cored connector and a flexible material layer that encloses the outside of the steel-cored connector. When the vegetable carrying component 50 is taken out from the thermal insulation case body 10, each connector is also separately pulled out from the foregoing liquid circulation pipeline 36, and when the vegetable carrying component 50 is inserted into the thermal insulation case body 10 again, a plug position is finely adjusted by using the flexible material outside the steel-cored connector in a case in which small displacement exists, so that the vegetable carrying component 50 may conveniently match the connector on the pipeline component, and the vegetable carrying component 50 is inserted into the thermal insulation case body 10 more easily, thereby implementing that the vegetable carrying component 50 is in water communication with the liquid circulation pipeline 36.

A diversion groove in communication with lower container 34 may be provided around the pluggable connector, and in this way, when the water connection between the vegetable carrying component 50 and fluid circulation pipeline 36 is disconnected, a remaining fluid in the pluggable connector may be diverted to the lower container 34 through the diversion groove, which further avoids a security problem caused by a water linkage.

The foregoing valve may be specifically disposed on a corresponding pluggable connector. A protruding portion may be further disposed around the pluggable connector, and in a case in which a water linkage occurs above the fluid circulation pipeline, leaked water may drop into the lower container 34 along the protruding portion, and is avoided from being in contact with an electric part, for example, a valve for controlling a water connection to be on or off.

Optionally, a heat pump system for preserving internal heat of the thermal insulation case body is further disposed at the back of the thermal insulation case body 10, and the foregoing electric control component is further configured to control a state of the heat pump system. A person skilled in the art should understand that, in an implementation manner, the heat pump system may include a compressor, a condenser, and a evaporator that are in communication with each other, where specifically, the electric control component may be connected to the compressor to control a state of the compressor, thereby controlling a temperature of the thermal insulation case body 10, and enabling the temperature to be kept within a range suitable for vegetable to slowly grow. The heat pump system is disposed at the back of the thermal insulation case body, which has a simple structure and is easy to maintain.

Optionally, the thermal insulation case body 10 is further provided with a temperature sensor for sending a temperature sensing signal to the electric control component, and/or a humidity sensor for sending a humidity sensing signal to the electric control component, and/or a concentration sensor for sending a concentration sensing signal to the electric control component. Specifically, the electric control component may control the state of the heat pump system according to the temperature sensing signal, or control a state of a humidifier (for example, each atomizer 24) in the thermal insulation case body 10 according to the humidity sensing signal, or collect the concentration sensing signal to display the concentration sensing signal on a control panel described below. By disposing the temperature sensor and the humidity sensor, temperature and humidity control may be more accurate; and by disposing the concentration sensor, a user may learn concentration information of the nutrient solution of the lower container 34 at any time, and can detect an anomaly in time.

The concentration sensor may be specifically disposed in the upper container 32, so that it is unnecessary to dispose a concentration sensor for each vegetable carrying component. In addition, whether the nutrient solution is sufficient may be further determined by using the concentration sensing signal.

Optionally, a control panel connected to the electric control component is disposed on a shell of the thermal insulation case body 10. The control panel may be specifically, for example, a PAD. The control panel may be specifically configured to display a control parameter such as a temperature, humidity, concentration, or luminous intensity, and may be further configured to receive a control instruction of the user, so as to perform various control operations by using the electric control component.

The sequence of the foregoing embodiments of the present invention are merely for the convenience of description, and do not imply the preference among the embodiments. Description of the embodiments focuses on different parts, and for a less detailed part in an embodiment, reference may be made to related description in other embodiments.

A person of ordinary skill in the art may understand that, all or some of the steps of the method embodiments may be implemented by a program instruction related hardware. The foregoing program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

In the method and apparatus embodiments of the present invention, obviously, the parts or the steps may be decomposed, combined, and/or recombined after decomposition. The decomposition and/or recombination should be considered as an equivalent solution of the present invention. In the foregoing description of the specific embodiments of the present invention, features described and/shown in one embodiment may be used in one or more other embodiments in a same or similar manner, and are combined with features shown in other embodiments, or substitute features in other embodiments.

It should be emphasized that, the term "include/contain" adopted in the specification specifies presence of features, elements, steps, or components, with presence or attachment of one or more other features, elements, steps, operations, or components.

Although the present invention and its advantages have been described in detail, it should be understood that various changes, substitutions and alterations can be made herein without departing from the spirit and scope of the present invention as defined by the appended claims. Moreover, the scope of the present invention is not intended to be limited to the specific embodiments of the process, devices, means, methods and steps described in the specification. As one of ordinary skilled in the art will readily appreciate from the disclosure of the present invention, processes, devices, means, methods, or steps, presently existing or later to be developed that perform substantially the same function or achieve substantially the same result as the corresponding embodiments described herein may be utilized according to the present invention.

Accordingly, the appended claims are intended to include within their scope such processes, devices, means, methods, or steps.

What is claimed is:

1. A vegetable preservation and growing case, comprising:
    an upper container;
    a lower container;
    a thermal insulation case body for vegetable growing or preservation, wherein an electric control component for electrically controlling the thermal insulation case body;
    a pipeline component for circularly supplying a nutrient solution to the thermal insulation case body, disposed at the back of the thermal insulation case body and comprising a liquid circulation pipeline;
    a plurality of vegetable carrying components, each of the vegetable carrying components disposed in the thermal insulation case body in a pluggable manner with the vegetable preservation and growing case and the each of the vegetable carrying components comprising:
        a solution carrying case comprising a plurality of protruding diversion partitions to form a zigzag flow passage in the solution carrying case to facilitate circulation of the nutrient solution in the pipeline component; and
        a vegetable shelf located above the solution carrying case;
    a high-level liquid inlet; and
    a low-level liquid outlet, wherein the high-level liquid inlet and the low-level liquid outlet are disposed on the solution carrying case, and the high-level liquid inlet is in communication with the upper container, the low-level liquid outlet is in communication with the lower container, and the nutrient solution in the upper container flows back to the lower container through the each of the vegetable carrying components under an action of gravity to reduce a circulation speed, thus keeping vegetable in a stagnant growth state or in a slow-growing state after the vegetable is picked, and
    wherein the nutrient solution is sequentially circulated among the upper container, the liquid circulation pipeline, the each of the vegetable carrying components and the lower container to form an independent circulation passage.

2. The vegetable preservation and growing case according to claim 1, wherein the electric control component comprises a first electromagnetic connection portion extending out of an inner surface of the thermal insulation case body, wherein an end of the each of the vegetable carrying components is provided with a second electromagnetic connection portion for being connected to a corresponding first electromagnetic connection portion.

3. The vegetable preservation and growing case according to claim 2, further comprising an illumination component that is disposed in the thermal insulation case body and is configured to illuminate the each of the vegetable carrying components from top to bottom, wherein the illumination component is connected to the first electromagnetic connection portion.

4. The vegetable preservation and growing case according to claim 3, wherein the each of the vegetable carrying components is disposed in the thermal insulation case body, and the each of the vegetable carrying components is disposed in parallel at intervals in a vertical direction.

5. The vegetable preservation and growing case according to claim 2, wherein the each of the vegetable carrying components is pluggably disposed in the thermal insulation case body, the second electromagnetic connection portion is connected to the first electromagnetic connection portion by means of a pluggable electric connection, and when the second electromagnetic connection portion of the each of the vegetable carrying components disconnects an electric connection to the first electromagnetic connection portion of the electric control component, the electric control component correlatively controls the pipeline component to disconnect a water connection to a corresponding vegetable carrying component.

6. The vegetable preservation and growing case according to claim 2, wherein the upper container and the lower container are further disposed in the thermal insulation case body, and the liquid circulation pipeline is in communication with the upper container and the lower container, and wherein the liquid circulation pipeline is provided with at least two through holes at intervals in a vertical direction, and is in communication with at least two corresponding vegetable carrying components through the through holes.

7. The vegetable preservation and growing case according to claim 6, wherein the liquid circulation pipeline is in water communication with the each of the vegetable carrying components by using a pluggable connector.

8. The vegetable preservation and growing case according to claim 1, wherein a heat pump system for preserving internal heat of the thermal insulation case body is further disposed at the back of the thermal insulation case body, and the electric control component is configured to control a state of the heat pump system.

9. The vegetable preservation and growing case according to claim 1, wherein the thermal insulation case body is further provided with a temperature sensor for sending a temperature sensing signal to the electric control component, and/or a humidity sensor for sending a humidity sensing signal to the electric control component.

10. The vegetable preservation and growing case according to claim 6, wherein the pipeline component further comprises a liquid pump for pumping the nutrient solution in the lower container to the upper container.

11. The vegetable preservation and growing case according to claim 6, wherein a valve for controlling supply of water of each of the through holes is provided on the liquid circulation pipeline, and the electric control component is configured to control a state of the valve.

12. The vegetable preservation and growing case according to claim 1, wherein the liquid circulation pipeline is in water communication with the each vegetable carrying component by using a pluggable connector.

13. The vegetable preservation and growing case according to claim 1, wherein the electric control component controls a state of an atomizer.

* * * * *